Feb. 26, 1924.
W. L. PATTERSON
1,485,147
PROJECTION APPARATUS WITH MOVABLE CONDENSING LENS
Filed Oct. 16, 1920
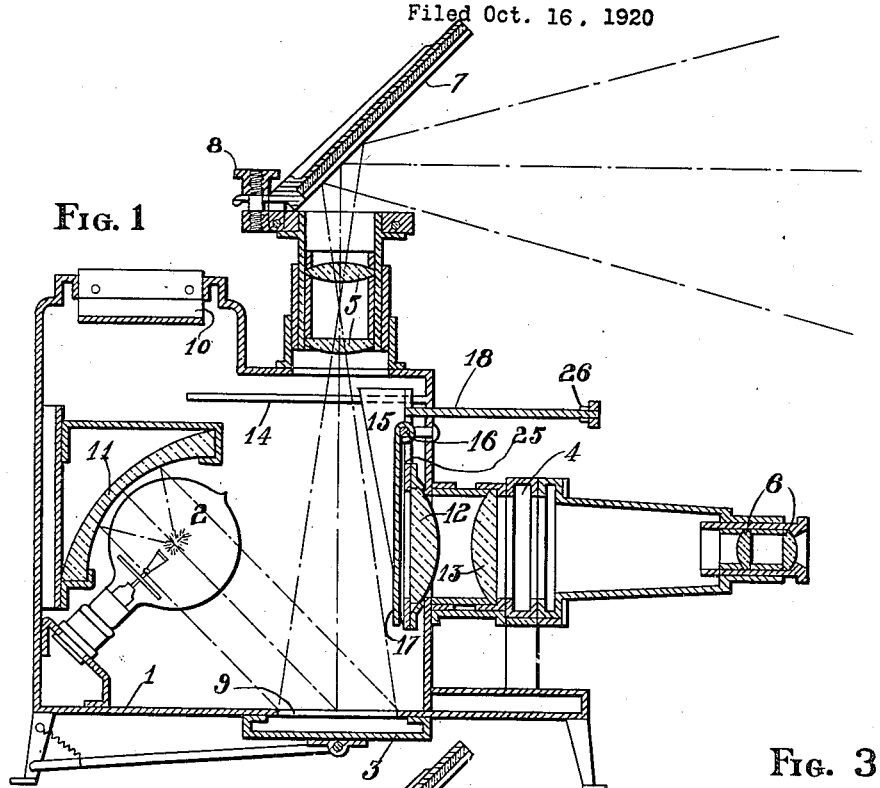
Fig. 1
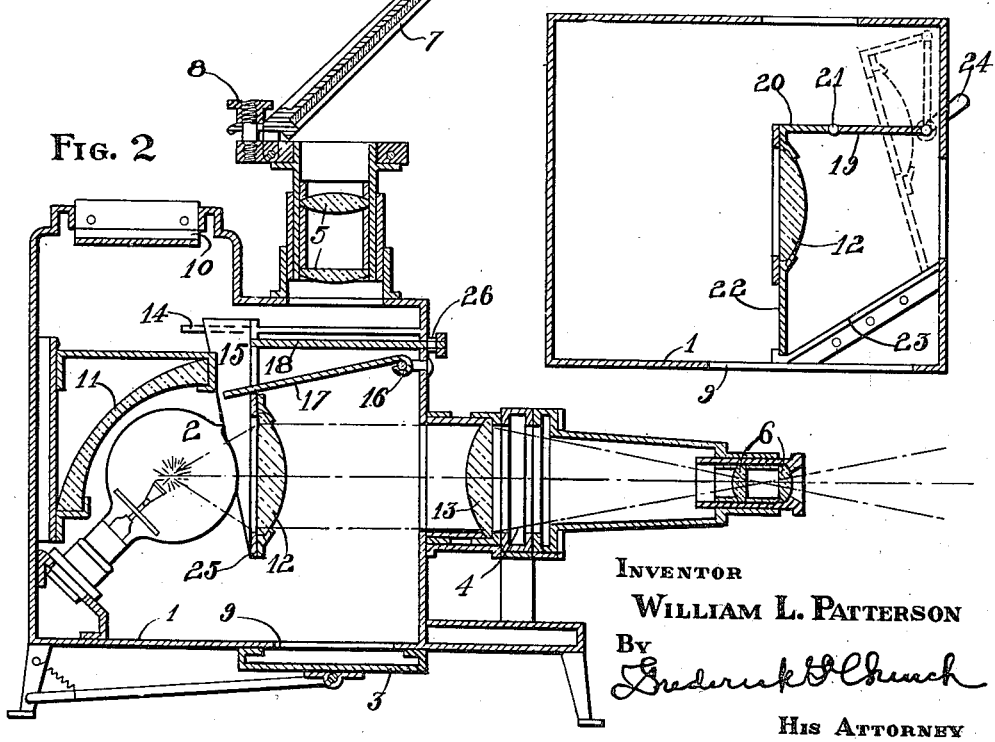
Fig. 2
Fig. 3
INVENTOR
WILLIAM L. PATTERSON
By Frederick P. Church
His Attorney Patented Feb. 26, 1924.

1,485,147

UNITED STATES PATENT OFFICE.

WILLIAM L. PATTERSON, OF ROCHESTER, NEW YORK, ASSIGNOR TO BAUSCH & LOMB OPTICAL COMPANY, OF ROCHESTER, NEW YORK, A CORPORATION OF NEW YORK.

PROJECTION APPARATUS WITH MOVABLE CONDENSING LENS.

Application filed October 16, 1920. Serial No. 417,370.

*To all whom it may concern:*

Be it known that I, WILLIAM L. PATTERSON, a citizen of the United States, residing at Rochester, in the county of Monroe and State of New York, have invented certain new and useful Improvements in Projection Apparatus with Movable Condensing Lenses; and I do hereby declare the following to be a full, clear, and exact description of the same, reference being had to the accompanying drawings, forming a part of the specification and to the reference numerals marked thereon.

My invention relates to optical apparatus for projecting an image upon a screen, and in particular to that class of projection apparatus adapted for use with either opaque objects, such as post cards, books etc. which are to be projected by reflected light, or transparent objects, such as the usual lantern slides which are projected by transmitted light. The object of my invention is to provide an apparatus of the above type which is adapted to give a strong illumination of the image when used only with transmitted light while at the same time being also adapted to give images of substantially uniform intensity of illumination when it is desired to use alternately or selectively both reflected and transmitted light. To these and other ends the invention consists in certain improvements and combinations of parts, all as will be hereinafter more fully described, the novel features being pointed out in the claims at the end of the specification.

In the drawings:

Figure 1 is a side view of my projection apparatus shown in cross section.

Figure 2 is a view similar to Figure 1 but with the movable condenser lens in a position juxtaposed to the lamp.

Figure 3 is a modified form of my invention showing another means for mounting and moving the condenser lens.

Similar reference characters throughout the several views indicate the same parts.

In that class of optical projection apparatus commonly known as magic lanterns it has been an old expedient to make such capable of use with oqaque objects such as books, or post cards, by reflected light rays, as well as with the customary lantern slides when the light rays are transmitted through them. It is usual with such class of apparatus that the amount of light absorbed in the projection of opaque objects is greater than that absorbed in the projection of transparent objects, and consequently the image of this opaque object produced by reflected light is often of less intensity of illumination than the image of the transparent object.

If a projection apparatus is to be used first for transparent objects and then for opaque objects, or vice versa, it is desirable to have the intensity of illumination of the screen substantially the same for both types of objects as otherwise the eye would become strained through the frequent contraction and expansion of the pupil with the different intensities of light on the screen. To accomplish this result it may be desirable to locate the condenser lens in optical coopera ion with the transparent object holder a sufficient distance from the source of light so that only a portion of the possible maximum illumination falls upon the transparent object holder, or it may be desirable to use a dark glass screen to reduce the light falling upon said transparent object holder. By the present invention it is not only possible to obtain this result but the device is also capable of giving an increased illumination when only transparent objects are to be used, and there then exists no need for toning down the illumination of the images of the transparent objects.

Referring to the drawing the numeral 1 indicates the customary casing or lamp house provided therein with a source of light 2 preferably an incandescent electric bulb of the gas filled type which has a substantially concentrated filament of high intrinsic brilliancy. The usual holder 3 for opaque or objects such as post cards, books etc. to be projected by reflected light, is provided on one side of the casing adjacent the light source and the customary holder 4 for transparencies or objects, such as lantern slides which are projected by transmitted light is also provided. The lens system for the opaque object holder comprises the objectives 5 while the lens system for the transparent object holder includes the condensing lenses 12 and 13 and the objectives 6. As is old in such form of projection apparatus a plano-reflector 7 may be provided for cooperation with the opaque object holders to direct the rays of light to ward the screen and may be furnished with the conventional adjusting means 8 for raising or lowering the image on the screen. Heretofore when the condensing lenses 12 and 13 have been arranged near one another in somewhat the position shown in Figure 1 it will be apparent that only a small portion of the direct rays emanating from the light source 2 fall upon the transparent object holder 4. In order to obtain an increased illumination of the transparent object holder, the condensing lens 12 is, in the present invention, made adjustable or movable toward the lamp 2 and it will be seen that in the position of the lens 12 shown in Figure 2 a greater number of light rays are included and directed upon the transparent object than is the case when the condensing lens 12 and 13 are close together and remote from the lamp. Provided on each side of the casing so as not to interfere with the reflected rays from the opaque object holder 3 are the guideways or rails 14 on which slides the carrier or frame 15 supporting the condenser lens 12. Pivoted at 16 to the casing is the shutter 17 which is adapted to permit operation of only one of the object holders at a time. If desired the shutter 18 may be freely mounted on its pivot so that movement of the frame 15 will, by means of its edge 25, cause the shutter 17 to move as the frame is moved. An operating handle 18 is provided for moving the frame 15 and condensing lens 12, and is provided with a shoulder 26 or stop to limit the movement of the lens 12 toward the lamp 2.

If desired the shutter 17 may be provided with a separate operating handle in which case the shutter may be moved to cut off the reflected rays from the opaque object holder independent of movement of the lens 12, and in this event the lens 12 may be adjusted to different distances from the light source 2 which will result in corresponding differences in the illumination of the image. If the shutter 17 is to be movable with the lens 12, it will be apparent that to obtain a reduced illumination of the transparent object or an intensity substantially equal to that of the opaque object that either a smoked or darkened glass screen must be removably inserted to cut down the illumination of the transparent object or else one of the condensing lenses must be coated or smoked. However, if the movement of the shutter is made independent of the movement of the condenser lens 12 it will be seen that the distance of the condensing lens from the light source may then be increased to such an amount as to make the use of a smoked glass screen unnecessary to cut down the illumination of the transparent object holder although the substitution of another lens 12 of different curvature may be desirable or necessary. When a lecture does not include the use of any opaque objects it may be desirable to have a stronger illumination of the transparent objects which is possible by adjustment of the condensing lens 12 to a position near the light source 2.

In order to cool the lamp house and prevent the dangerous rise of temperature, convection currents may enter the bottom of the casing through the aperture 9 directly over the opaque object holder and pass out at the top of the casing through the light tight ventilator 10. The shoulder 26 on the operating handle 18 prevents the lens being brought too close to the lamp and always permits the circulation of cooling air currents on all sides of the lens 12 and especially between the lens and lamp when the same are close together, as shown in Figure 2.

Figure 3 illustrates a modified form of my invention in which the usual casing 1 is provided as before with the opening 9, and the condenser lens 12 is made movable or slidable to and from a position adjacent the lamp, but in this case the shutter comprises the jointed plates 19 and 20 pivoted at 21, and also the lower plate 22 below the condensing lens. With the parts arranged as shown by the full lines, the lens is disposed adjacent the light source, and the plates 19 and 20 of the shutter prevent the reflected rays from the opaque object holder passing into their objectives. An operating handle 24 is provided for moving the shutter and lens. In the position shown by dotted lines in Figure 3, the lens is withdrawn from the lamp and the lower portion 22 of the shutter cuts off the direct rays and prevents illumination of the transparent object holder. Arranged on each side of the opaque object holder so as not to interfere with the operation thereof are the inclined members 23 on which the lower portion 22 of the shutter is adapted to slide as the lens is moved to and from the lamp.

Among the advantages of my invention may be mentioned the effective cooling system whereby it is possible to bring the lens 12 close to the lamp without having the same become dangerously heated. Perhaps the most important advantageous feature of the present invention is the ability to give substantially equal intensity of illumination for opaque objects as for transparent objects but at the same time to be capable of giving increased illumination of the transparent objects when no use is made of the opaque object holder, and this is accomplished without the use of a rheostat and without moving the lamp and needlessly jarring its delicate filaments.

I claim as my invention:

1. In a projection apparatus, the combination with a source of light, of a holder for objects to be projected by transmitted light, a holder for objects to be projected by reflected light, and an adjustable condenser lens in optical relationship with the first mentioned object holder, and means for moving said lens nearer the light source when the apparatus is to be used for transmitted light alone than when used for reflected light.

2. In a projection apparatus, the combination with a casing, of a source of light therein, holders for objects to be projected by transmitted and reflected light, and a condenser lens movable within said casing to a position adjacent said light source when an image is to be projected by transmitted light and movable away from said light source and out of the path of light rays used in the projection of an image by reflected light.

3. In an optical projection apparatus, the combination with a lamp house, of a source of light therein, holders for objects to be projected by transmitted and reflected light, a condenser lens in optical relationship with the object holder for transmitted light and movable toward and from the source of light, a shutter movable to permit the selective projection of images by reflected or transmitted light, and operating means for moving the lens and shutter together.

4. In a projection apparatus, the combination with a casing, of a source of light therein, holders for objects to be projected by reflected and transmitted light, a portion of the light rays illuminating the holder for objects projected by reflected light, and a condenser lens located between said light source and the light rays reflected from that object holder and adapted to direct another portion of the light rays emanating from said source onto the other or holder for objects projected by transmitted light.

5. In an optical projection apparatus, the combination with a lamp house, of a source of light therein, holders for transparencies or objects to be projected by transmitted light and for opaque objects or those to be projected by reflected light, a condensing lens between the light source and transparent object holder, guideways within said lamp house from which the condensing lens is supported and slidable toward and from the light source, a shutter movable with said condensing lens to permit the selective projection by reflected and transmitted light, said shutter in one position being adapted to cut off the light rays reflected by the opaque object holder and in another position to prevent light rays falling upon the transparent object holder, and an operating handle for moving both the lens and shutter.

WILLIAM L. PATTERSON.